(12) United States Patent
Leu et al.

(10) Patent No.: US 6,819,835 B2
(45) Date of Patent: Nov. 16, 2004

(54) TUNABLE FILTER DEVICE

(75) Inventors: Charles Leu, Fremont, CA (US); Ga-Lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 29 days.

(21) Appl. No.: 10/404,473

(22) Filed: Mar. 31, 2003

(65) Prior Publication Data

US 2004/0105621 A1 Jun. 3, 2004

(30) Foreign Application Priority Data

Nov. 29, 2002 (TW) .......................................... 91134742 A

(51) Int. Cl.$^7$ ................................................ G02B 6/34
(52) U.S. Cl. ............................ 385/37; 385/31; 359/566
(58) Field of Search ............................... 385/10, 27, 37

(56) References Cited

U.S. PATENT DOCUMENTS 6,728,445 B2 * 4/2004 Blomquist et al. ............ 385/37
6,738,536 B2 * 5/2004 Boettcher et al. ............. 385/10
6,738,543 B1 * 5/2004 Beeson et al. ................ 385/27

* cited by examiner

Primary Examiner—Phan T. H. Palmer
Assistant Examiner—Jennifer Doan
(74) Attorney, Agent, or Firm—Wei Te Chung

(57) ABSTRACT

A tunable filter device (10) has a plurality of input waveguide channels (141, 142, 143), a plurality of output waveguide channels (161, 162, 163) and a Bragg grating (13) which are formed in a planar waveguide (111). Every input waveguide channel couples with the Bragg grating at a different angle, and every output waveguide channel is a mirror image of a particular input waveguide channel. When input light transmits through a particular input waveguide channel, light of a particular wavelength is reflected by the Bragg grating to a corresponding, mirror image output waveguide channel.

19 Claims, 2 Drawing Sheets

TUNABLE FILTER DEVICE

BACKGROUND OF THE INVENTION

1. Field of the Invention

The present invention generally relates to filter devices, and more particularly to a tunable filter device.

2. Description of Prior Art

Bragg gratings are well known and widely used in a variety of optical applications. In general, a Bragg grating is formed by providing a periodic variation in the refractive index of the core of an optical fiber or a planar waveguide. The periodic variations of gratings cause reflection of a particular Bragg wavelength. All other incident wavelengths are transmitted through the grating.

However, a conventional filter device using the Bragg grating has a shortcoming. That is, the wavelength of the reflected light is fixed when the filter device is manufactured.

Therefore, a filter device which can be tunable to reflect a wavelength within a range of different wavelengths is desired to overcome the shortcoming of the prior art.

SUMMARY OF THE INVENTION

Accordingly, an object of the present invention is to provide a tunable filter device.

To achieve the above-mentioned object, a tunable filter device in accordance with the present invention includes a plurality of input waveguide channels, a plurality of output waveguide channels and a Bragg grating which are formed in a planar waveguide. Every input waveguide channel couples with the Bragg grating at a different angle, and every output waveguide channel is a mirror image of a corresponding input waveguide channel. When input light is transmitted through a particular input waveguide channel, light of a particular wavelength is reflected by the Bragg grating into a corresponding, mirror image output waveguide channel.

BRIEF DESCRIPTION OF THE DRAWINGS

Other objects, advantages and novel features of the present invention will be drawn from the following detailed description of a preferred embodiment of the present invention with attached drawings, in which.

DETAILED DESCRIPTION OF PREFERRED EMBODIMENT

Figure 1:
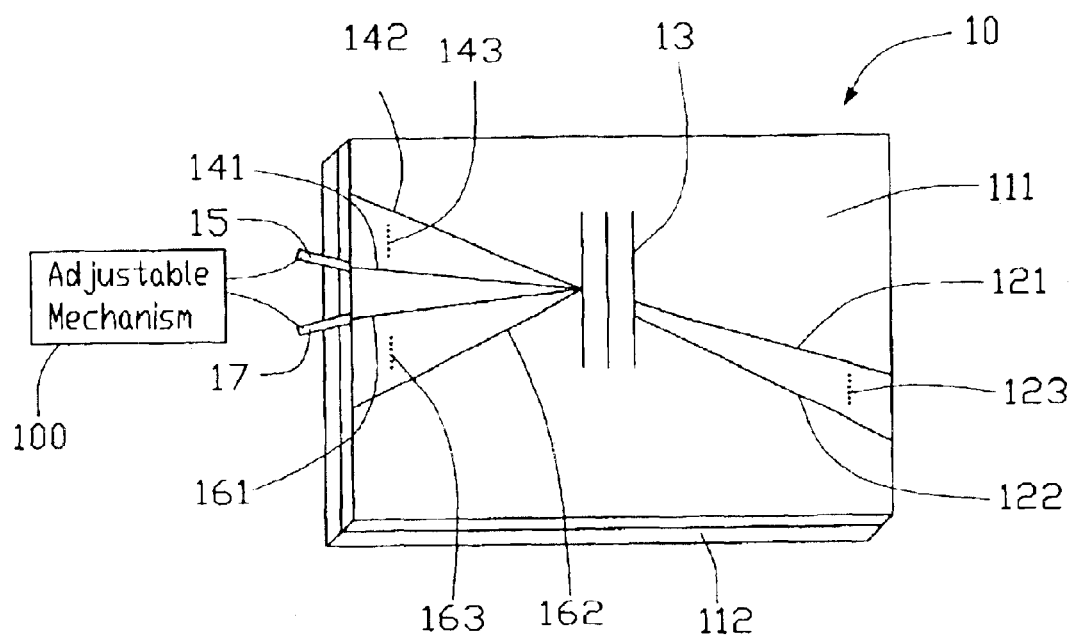
FIG. 1 is a schematic diagram of a tunable filter device in accordance with a first embodiment of the present invention.

Referring to FIG. 1, a tunable filter device 10 in accordance with a first embodiment of the present invention comprises a plurality of input waveguide channels 141, 142, 143, a plurality of output waveguide channels 161, 162, 163 and a Bragg grating 13 which are formed on a planar waveguide 111. Dots 143 indicate the unshown input waveguide channels located between the first and Nth input waveguide channels 141, 142, and dots 163 indicate the unshown output waveguide channels located between the first and Nth output waveguide channels 161, 162. The planar waveguide 111 is made of germania-silica and is formed on a silicon substrate 112.

The plurality of input waveguide channels 141, 142, 143 couple with the Bragg grating 13, and respectively form a different angle with a normal of the Bragg grating 13. Every output waveguide channel 161, 162, 163 is a mirror image of a corresponding input waveguide channel 141, 142, 143 and forms an angle with the normal of the Bragg grating 13 which is equal to that formed by the corresponding input waveguide channels 141, 142, 143. An input port 15 selectively couples with one of the input waveguide channels 141, 142, 143, and an output port 17 couples with the corresponding output waveguide channel 161, 162, 163 which is a mirror image of the input waveguide channel coupled with the input port 15.

When the input port 15 couples with an ith (i=1–N) input waveguide channel, input light consisting of a plurality of different wavelengths is transmitted through the ith input waveguide channel, and is incident on the Bragg grating 13 at an angle $\theta_i$. Light having a wavelength $\lambda_i = 2d/(1-(\sin^2\theta/n^2))^{0.5}$, where d and n are respectively a grating period and a refractive index of the Bragg grating 13, is reflected by the Bragg grating 13 to the corresponding ith output waveguide channel, and remainder light wavelengths pass through the Bragg grating 13. The reflected light is output through the output port 17.

A plurality of transmission waveguide channels 121, 122, 123 are located at an opposite side of the Bragg grating 13 for coupling remainder light wavelengths from the Bragg grating 13 to other optical elements (not shown). Dots 123 indicate the unshown transmission waveguide channels between the transmission waveguide channels 121, 122. Every transmission waveguide channel 121, 122, 123 is parallel to a corresponding input waveguide channel 141, 142, 143 to ensure optical transmission therebetween.

An adjustable mechanism 100 connects to the input and output ports 15, 17, and controls coupling of the input and output ports with the input and output waveguide channels to ensure that corresponding, mirror image input and output waveguide channels are coupled with the input and output ports at a same time.

Figure 2:
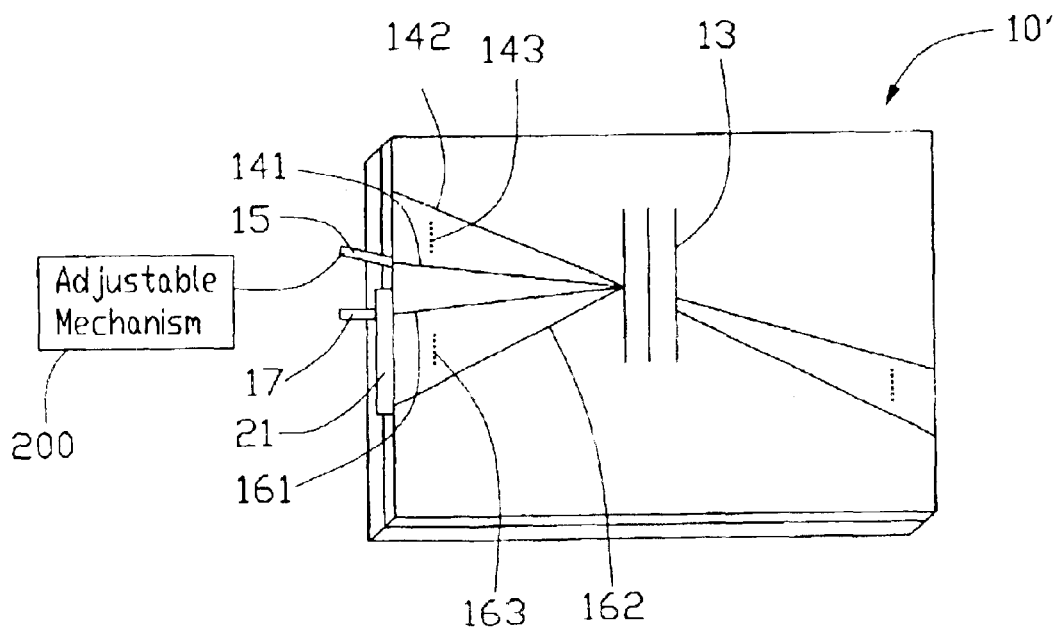
FIG. 2 is a schematic diagram of a tunable filter device in accordance with a second embodiment of the present invention.

Referring to FIG. 2, a tunable filter device 10' of a second embodiment of the present invention is disclosed. The tunable filter device 10' is substantially identical to the tunable filter device 10, but further comprises a coupler 21. The coupler 21 couples with the plurality of output waveguide channels 161, 162, 163 and the output port 17. Thus light from every output waveguide channel can transmit to the output port 17 even though the output port 17 is not directly coupled to a single output waveguide channel. An adjustable mechanism 200 connects to the input port 15, and controls coupling of the input port to the input waveguide channels to ensure proper input of light from the input port 15 into an intended input waveguide channel.

Figure 3:
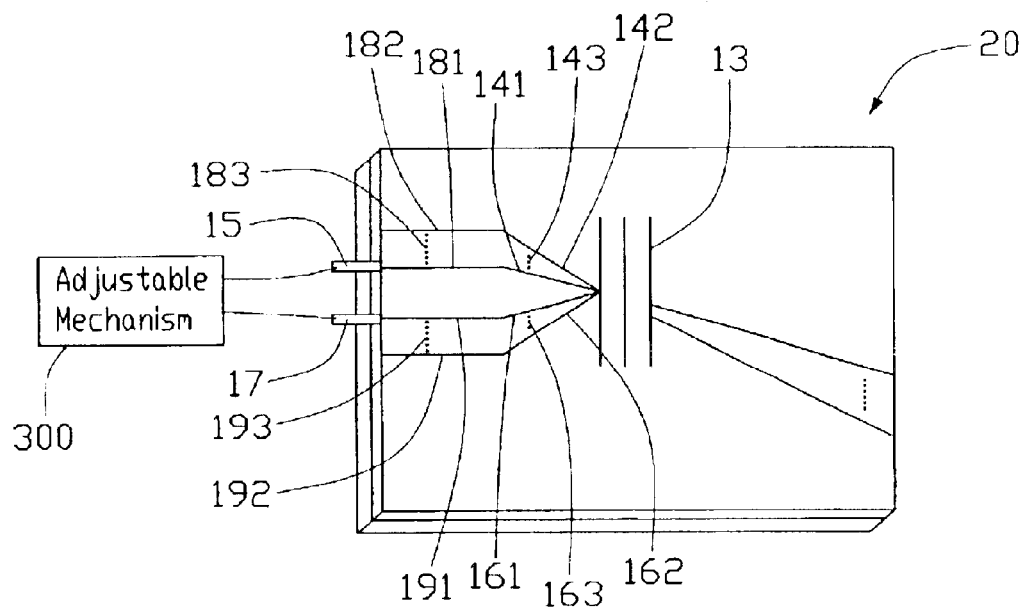
FIG. 3 is a schematic diagram of a tunable filter device in accordance with a third embodiment of the present invention.

Referring to FIG. 3, a tunable filter device 20 of a third embodiment of the present invention is disclosed. The tunable filter device 20 is substantially identical to the tunable filter device 10, but further comprises a plurality of input connection channels 181, 182, 183 and a plurality of output connection channels 191, 192, 193 which are parallel to the normal of the Bragg grating 13. Dots 183 indicate the unshown input connection channels between the input connection channels 181, 182, and dots 193 indicate the unshown output connection channels between the output connection channels 191, 192. The input connection channels 181, 182, 183 each couple with a corresponding input waveguide channel 141, 142, 143. The output connection channels 191, 192, 193 each couple with a corresponding output waveguide channel 161, 162, 163. The input and output ports 15, 17 are each couplable with a single input connection channel 181, 182, 183 and a single output connection channel 191, 192, 193, respectively. An adjustable mechanism 300 controls the coupling of the input and output ports with corresponding pair of input and output connection channels, respectively.

Figure 4:
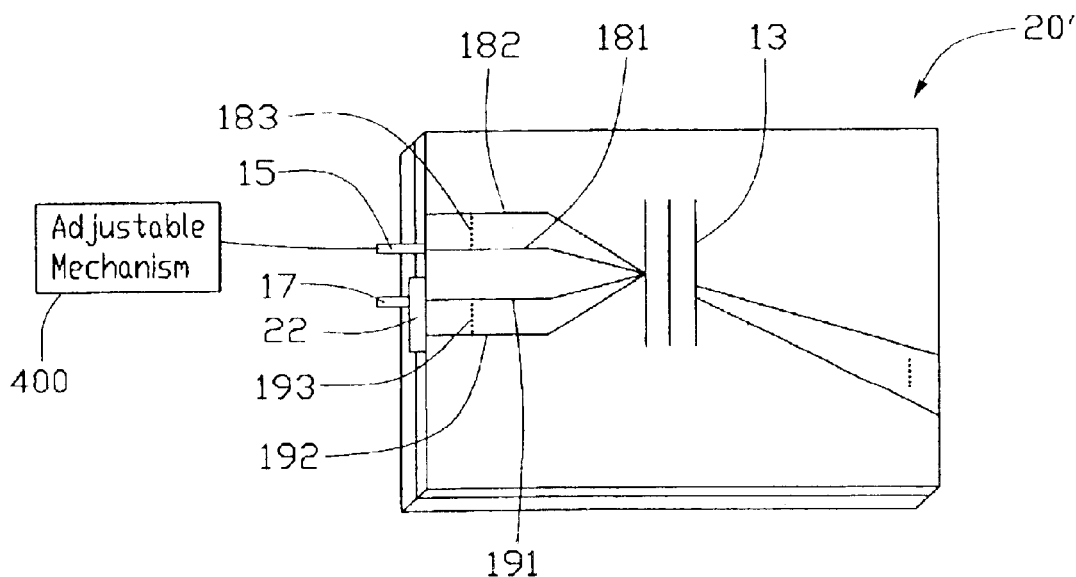
FIG. 4 is a schematic diagram of a tunable filter device in accordance with a fourth embodiment of the present invention.

Referring to FIG. 4, a tunable filter device 20' of a fourth embodiment of the present invention is disclosed. The tunable filter device 20' is substantially identical to the tunable filter device 20, but further comprises a coupler 22. The coupler 22 couples with the plurality of output connection channels 191, 192, 193 and the output port 17. Thus light from every output connection channel can transmit to the output port 17, without need to adjust the coupling of the output port 17 with a given output connection channel. An adjustable mechanism 400 connects to the input port 15, and controls coupling of the input port 15 with a desired input connection channel 181, 182, 183.

Compared with conventional Bragg gratings, the tunable filter device in accordance with the present invention can tunably filter a desied wavelength from an input light beam by changing the input waveguide channel 141, 142, 143 through which the input light beam is transmitted. The change in input waveguide channel changes the $\theta_i$ of the input light, which changes the $\lambda_i$ reflected by the grating 13.

Although the present invention has been described with reference to a specific embodiment, it should be noted that the described embodiment is not necessarily exclusive and that various changes and modifications may be made to the described embodiment without departing from the scope of the invention as defined by the appended claims.

What is claimed is:

1. A tunable filter device comprising:
   a planar waveguide with a plurality of input waveguide channels and a plurality of output waveguide channels;
   a Bragg grating located in the planar waveguide;
   said every input waveguide channel angularly merging at a different acute angle with a normal of the Bragg grating; and
   said every output waveguide channel being a mirror image of a corresponding input waveguide channel;
   wherein, when input light signals consisting of a plurality of different, spectrally separated wavelengths transmit in a particular input waveguide channel and incident on the Bragg grating, a light beam with a predetermined wavelength is reflected by the Bragg grating and transmits to an output waveguide channel which is a mirror image of the input waveguide channel.

2. The tunable filter device in accordance with claim 1, further comprising a plurality of transmission channels located at an opposite side of the Bragg grating, said every transmission channel being parallel to a corresponding input waveguide channel.

3. The tunable filter device in accordance with claim 2, further comprising an adjustable mechanism to adjust an input port and an output port, and coupling of the input port and the output port, said input and output ports respectively coupling with a corresponding input and output waveguide channels.

4. The tunable filter device in accordance with claim 2, further comprising a plurality of input and output connection channels parallel to the normal of the Bragg grating, and respectively coupling with corresponding input and output waveguide channels.

5. The tunable filter device in accordance with claim 4, further comprising an input and output ports and an adjustment mechanism for controlling coupling of said input and output ports respectively with corresponding input and output connection channels.

6. The tunable filter device in accordance with claim 5, wherein the adjustment mechanism controls the input and output ports to move in a direction perpendicular to the normal of the Bragg grating.

7. The tunable filter device in accordance with claim 4, further comprising an input port and an output port, and a coupler which couples with the output port and the plurality of output connection channels.

8. The tunable filter device in accordance with claim 7, further comprising an adjustment mechanism for controlling coupling of the input port with a desired input waveguide channels.

9. The tunable filter device in accordance with claim 2, further comprising an input port and an output port, and a coupler which couples the output port and the plurality of output waveguide channels.

10. The tunable filter device in accordance with claim 9, further comprising an adjustment mechanism for controlling coupling of the input port with a desired input waveguide channel.

11. The tunable filter device in accordance with claim 1, wherein the planar waveguide is made of germania-silica, and is formed on a silicon substrate.

12. A tunable filter device comprising:
    a planar waveguide;
    a plurality of input waveguide channels formed in the planar waveguide;
    a plurality of output waveguide channels formed in the planar waveguide;
    a Bragg grating located in the planar waveguide;
    said every input waveguide channel angularly merging at a different acute angle with a normal of the Bragg grating;
    said every output waveguide channel being a mirror image of a corresponding input waveguide channel;
    an input port;
    an output port; and
    an adjustable mechanism which controls coupling of light from the input port into a desired input waveguide channel.

13. The tunable filter device in accordance with claim 12, further comprising a coupler which couples the output port and the plurality of output waveguide channels.

14. The tunable filter device in accordance with claim 12, further comprising a plurality of input and output connection channels parallel to the normal of the Bragg grating, and respectively coupling with corresponding input and output waveguide channels.

15. The tunable filter device in accordance with claim 14, wherein the adjustable mechanism controls the coupling of the input and output ports with corresponding input and output connection channels by moving the input and output ports in a direction parallel to the Bragg grating.

16. The tunable filter device in accordance with claim 14, further comprising a coupler which couples with the output port and the plurality of output connection channels.

17. The tunable filter device in accordance with claim 16, wherein the adjustable mechanism controls the coupling of the input port with a desired input connection channel, and thus an input waveguide channel, by moving the input port in a direction parallel to the Bragg grating.

18. The tunable filter device in accordance with claim 12, wherein the planar waveguide is made of germania-silica, and is formed on a silicon substrate.

19. A tunable filter device comprising:
- a waveguide defining a plurality of input waveguide channels and a plurality of output waveguide channels;
- a Bragg grating provided in the waveguide;
- said output waveguide channels and said input waveguide channels being located on a same side of the Bragg grating, and said output waveguide channels being roughly of mirror images of the corresponding input waveguide channels, respectively, with regard to said Bragg grating due to reflection; and
- input and output ports commonly controlled by an adjustable mechanism and located at said same side to align with the corresponding input and output waveguide channels; wherein
  - a light beam transmitted into the input port is regulated by a formula of $\lambda_i = 2d/(1-(\sin^2\theta_i/n^2))^{0.5}$, where d and n are respectively a grating period and a refractive index of the Bragg grating, $\theta_i$ is an incident angle of the light beam on the Bragg grating, and $\lambda_i$ is the wavelength of a reflected light beam obtained at the output port.

* * * * *